US012677067B2

(12) United States Patent
Shibata

(10) Patent No.: US 12,677,067 B2
(45) Date of Patent: Jul. 7, 2026

(54) SHAKE AMOUNT ACQUISITION APPARATUS, SHAKE AMOUNT ACQUISITION METHOD, IMAGE PICKUP APPARATUS, AND CONTROL APPARATUS FOR IMAGE PICKUP APPARATUS

(71) Applicant: CANON KABUSHIKI KAISHA, Tokyo (JP)

(72) Inventor: Masahiro Shibata, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/756,568

(22) Filed: Jun. 27, 2024

(65) Prior Publication Data

US 2025/0008219 A1 Jan. 2, 2025

(30) Foreign Application Priority Data

Jun. 28, 2023 (JP) ................................. 2023-105950

(51) Int. Cl.
*H04N 23/68* (2023.01)
*G01C 19/5776* (2012.01)
*G01P 13/00* (2006.01)

(52) U.S. Cl.
CPC ....... *H04N 23/683* (2023.01); *G01C 19/5776* (2013.01); *G01P 13/00* (2013.01); *H04N 23/6811* (2023.01); *H04N 23/6812* (2023.01)

(58) Field of Classification Search
CPC .................................................. H04N 23/683
See application file for complete search history.

(56) References Cited

U.S. PATENT DOCUMENTS

| | | | | |
|---|---|---|---|---|
| 9,137,427 B2 * | 9/2015 | Shido | ..................... | H04N 23/63 |
| 2019/0158745 A1 * | 5/2019 | Idaka | ................. | H04N 23/6815 |
| 2019/0182426 A1 * | 6/2019 | Higashi | .................. | H04N 23/80 |
| 2022/0070377 A1 * | 3/2022 | Hirama | .............. | H04N 23/6812 |

FOREIGN PATENT DOCUMENTS

| | | |
|---|---|---|
| JP | 2005151542 A | 6/2005 |
| JP | 2012037778 A | 2/2012 |
| JP | 2013178503 A | 9/2013 |

* cited by examiner

*Primary Examiner* — Cynthia Calderon
(74) *Attorney, Agent, or Firm* — Canon U.S.A., Inc. IP Division

(57) ABSTRACT

A shake amount acquisition apparatus includes a first acquisition unit configured to acquire a shake detection result from a shake detection unit that is configured to detect a shake and is provided in a rotation portion driven to rotate with respect to a base, a second acquisition unit configured to acquire a drive velocity of the rotation portion, and a reference value calculation unit configured to calculate a reference value of the shake detection unit based on the shake detection result and the drive velocity.

15 Claims, 4 Drawing Sheets

SHAKE AMOUNT ACQUISITION APPARATUS, SHAKE AMOUNT ACQUISITION METHOD, IMAGE PICKUP APPARATUS, AND CONTROL APPARATUS FOR IMAGE PICKUP APPARATUS

BACKGROUND

Field of the Disclosure

The present disclosure relates to a shake amount acquisition apparatus that acquires a shake amount, a shake amount acquisition method, an image pickup apparatus, and a control method for the image pickup apparatus.

Description of the Related Art

Conventionally, it is common that an image blur correction system mounted on an image pickup apparatus, such as a camera, detects vibrations applied to the camera by using a sensor to detect acceleration, angular acceleration, angular velocity, angular displacement, or the like, and performs optical or electronic correction in accordance with the detected vibrations. As a sensor to detect vibrations of a camera, a gyro sensor that detects an angular velocity is typically used. However, the gyro sensor is greatly influenced by a direct-current (DC) offset and drift caused by a temperature change or the like, and thus there is a need for a mechanism that removes such an offset component from a reference value. As a method for removing offset components of a gyro sensor, Japanese Patent Application Laid-Open No. 2005-151542 discusses a method for calculating an output average of the gyro sensor as a reference value, and a method for separately detecting a motion vector signal and feeding the signal back for the calculation of the reference value. Japanese Patent Application Laid-Open No. 2013-178503 discusses a method in which, since it is difficult to calculate a reference value during panning, it is determined whether panning is being performed based on the amount of temporal change in a DC component of the angular velocity, and the DC component in a state where it is determined that panning is not being performed is used as a reference value.

As discussed in Japanese Patent Application Laid-Open No. 2013-178503, it is difficult to calculate the reference value during panning. The difference between the reference value acquired before panning and the actual reference value therefore increases immediately after panning when the reference value of the angular velocity sensor varies during slow panning.

SUMMARY

In order to achieve the above-described object, a shake amount acquisition apparatus according to an aspect of the present disclosure includes a first acquisition unit configured to acquire a shake detection result from a shake detection unit that is configured to detect a shake and is provided in a rotation portion driven to rotate with respect to a base, a second acquisition unit configured to acquire a drive velocity of the rotation portion, and a reference value calculation unit configured to calculate a reference value of the shake detection unit based on the shake detection result and the drive velocity. Other features of the present disclosure will be described in exemplary embodiments of the present disclosure.

Further features of the present disclosure will become apparent from the following description of exemplary embodiments with reference to the attached drawings.

DESCRIPTION OF THE EMBODIMENTS

Figure 1A:
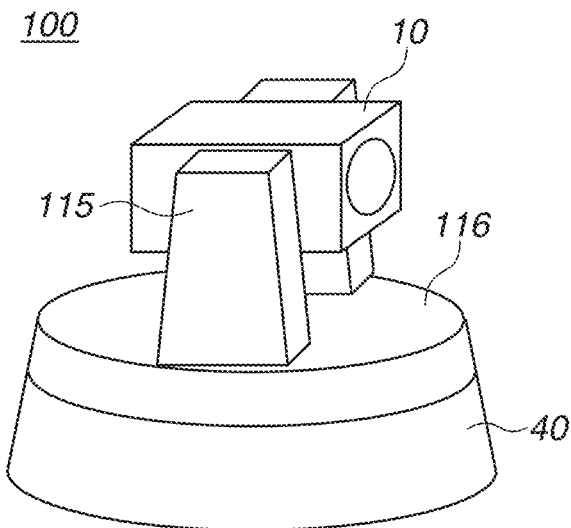
FIGS. 1A and 1B are diagrams illustrating a configuration example of an image pickup apparatus according to one or more aspects of the present disclosure.

Hereinafter, exemplary embodiments of the present disclosure will be described in detail with reference to the accompanying drawings. In the drawings, the same reference numerals denote the same members, and repetitive descriptions thereof will be omitted. The following exemplary embodiments do not limit the disclosure according to the appended claims. Although a plurality of features is described in the exemplary embodiments, all of the plurality of features are not necessarily essential to the disclosure, and the plurality of features may be arbitrarily combined.

Figure 1B:
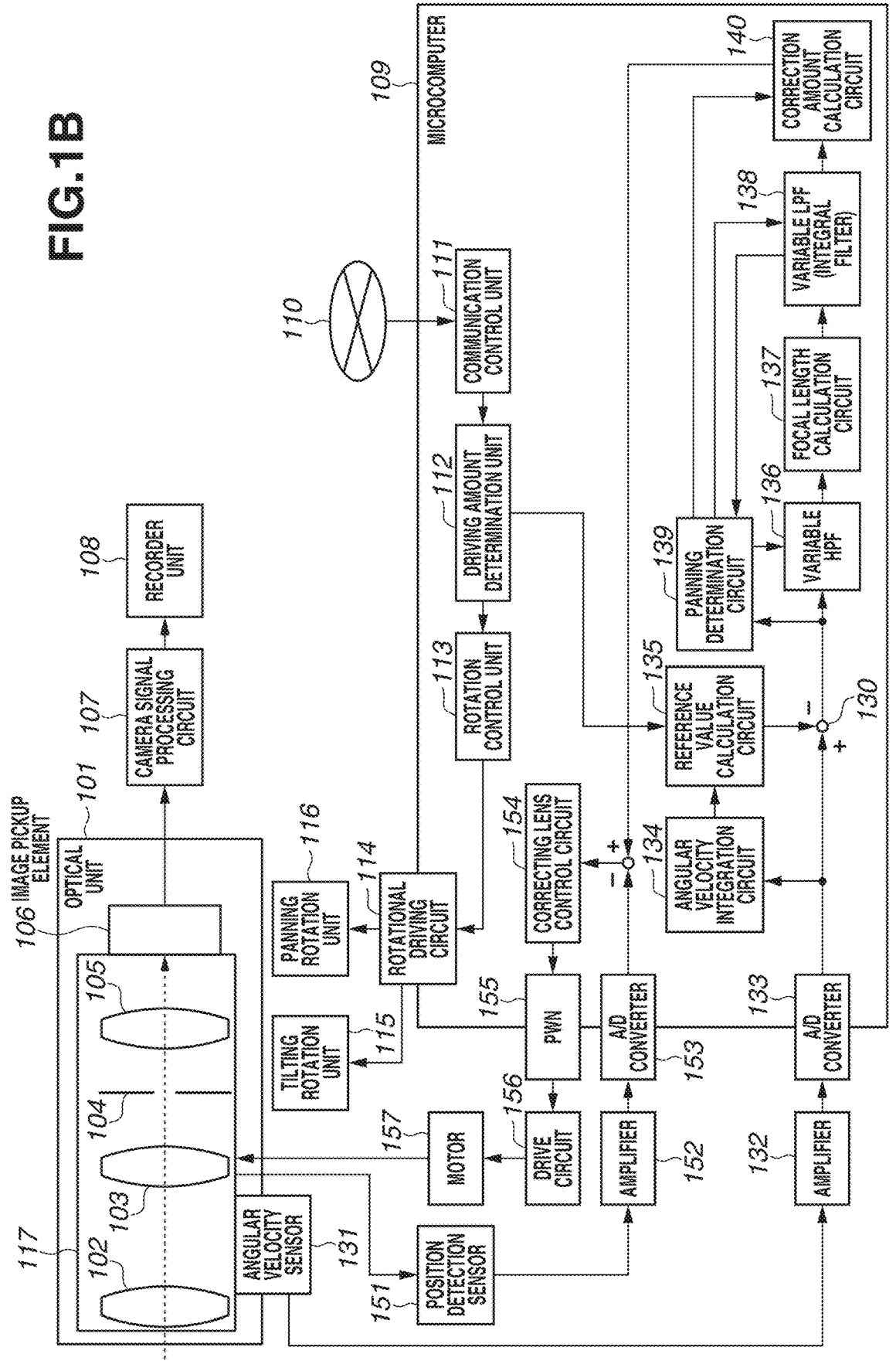

FIGS. 1A and 1B are diagrams illustrating a system configuration of an image pickup apparatus 100 having an image blur correction function according to a first exemplary embodiment. FIG. 1A is an external view of the image pickup apparatus 100, and FIG. 1B is a block diagram of a system including the image pickup apparatus 100.

As illustrated in FIG. 1A, the image pickup apparatus 100 includes a base portion 40 and a rotation portion 10 that is configured to be able to perform rotational driving, such as panning driving and tilting driving, with respect to the base portion 40. The base portion 40 and the rotation portion 10 are connected to each other via a tilting rotation unit 115 and the panning rotation unit 116. Each of the tilting rotation unit 115 and the panning rotation unit 116 includes an actuator and a rotation mechanism and is configured to be able to perform tilting driving and panning driving when each actuator is driven by a rotational driving circuit 114 described below.

A system configuration including the image pickup apparatus 100 will be described in detail with reference to FIG. 1B. The rotation portion 10 includes an optical unit 101 and an angular velocity sensor 131. The optical unit 101 includes a lens barrel 117 and an image pickup element 106. The lens barrel 117 includes an imaging optical system including a magnification variation lens group (zoom lens) 102 that performs magnification variation by changing a focal length, a correcting lens group (shift lens) 103 that corrects image blur by moving in a direction orthogonal to an optical axis, a diaphragm 104 that adjusts a light amount, and a lens group (focus lens) 105 having both a focus adjustment function and what is called a compensation function to correct the motion of a focal plane due to magnification. The image pickup element 106 captures a subject image formed through the lens groups 102, 103, 104, and 105 included in the imaging optical system. The image pickup element 106 is an imaging sensor that receives light from the imaging optical system, converts the received optical signal into an electrical signal by photoelectric conversion, and outputs the electric signal as an analog image signal. The image pickup element 106 is, for example, a charge-coupled device (CCD) or a complementary metal-oxide semiconductor (CMOS).

An output signal from the image pickup element 106 is transmitted to a camera signal processing circuit 107. The camera signal processing circuit 107 is a processing circuit that acquires an output signal and performs signal processing of an image and includes an analog signal processing circuit and a digital signal processing circuit. The analog signal processing circuit performs predetermined processing on a signal obtained by the image pickup element 106 to generate an analog image pickup signal. For example, the analog signal processing circuit includes a corelated double sampling (CDS) circuit or an automatic gain control (AGC) circuit. The digital signal processing circuit converts an analog image pickup signal into a digital signal by an analog-digital (A/D) converter and generates a digital image signal subjected to predetermined signal processing, such as gamma correction and white balance.

A recorder unit 108 includes a recording device (not illustrated) that records image signals on a recording medium (e.g., memory card, hard disk, DVD, and magnetic tape), a display device (not illustrated), such as a liquid crystal panel and a view finder to output/display image signals, and control circuits for these devices. According to the present exemplary embodiment, it is assumed that the camera signal processing circuit 107 and the recorder unit 108 are installed inside the base portion 40, but the positions thereof are not particularly limited, and some or all thereof may be provided in the rotation portion 10.

The entire image pickup apparatus 100 is controlled by a microcomputer 109. The microcomputer 109 is connected to a client apparatus (not illustrated) via a network 110 and can communicate with each other. The client apparatus is an apparatus including a controller with which a user gives an instruction to the image pickup apparatus 100 to rotationally drive the rotation portion 10 or to record an image (no matter whether a still or a motion image), a monitor with which the user verifies a captured image, and the like. The network 110 is implemented by, for example, the Internet, a wired local area network (LAN), a wireless LAN, or a wide area network (WAN). According to the present exemplary embodiment, a case will be described where the image pickup apparatus 100 and the client apparatus are connected to each other via the network 110; however, the image pickup apparatus 100 and the client apparatus may be connected to each other via an interface other than the network, and a method for controlling the image pickup apparatus 100 is not limited thereto.

A functional block of the inside of the microcomputer 109 will now be described. The microcomputer 109 includes a communication control unit 111 and receives an instruction to the image pickup apparatus 100 from the client apparatus via the network 110 by the communication control unit 111. Specifically, the instruction includes a lens operation instruction, such as zoom/focus, or an image recording operation instruction, such as record/stop and still image recording. As one of these instructions, the microcomputer 109 receives a rotational driving instruction of the rotation portion 10 including the optical unit 101.

A driving amount determination unit 112 determines a driving target value and a rotational driving amount for panning/tilting driving of the rotation portion 10 based on the rotational driving instruction, such as the rotation angle, the speed of rotation, and the driving time received from the client apparatus by the communication control unit 111. The driving target value is referred to as time-series data representing a target position of the rotation portion 10, and the rotational driving amount is referred to as time-series data representing a driving angular velocity of the rotation portion 10. A rotation control unit 113 acquires the driving target value and the rotational driving amount from the driving amount determination unit 112 and generates a control instruction for controlling the rotational driving of the rotation portion 10 based on the acquired information. The rotational driving circuit 114 generates a driving signal for driving the tilting rotation unit 115 and the panning rotation unit 116 in accordance with a control instruction from the rotation control unit 113 and transmits a driving vibration to each unit. According to the present exemplary embodiment, the driving amount determination unit 112, the rotation control unit 113, and the rotational driving circuit 114 function as a rotation control unit that controls the rotational driving of the rotation portion 10.

The tilting rotation unit 115 is a rotation mechanism unit including a tilting drive motor that rotates the rotation portion 10 about a horizontal axis (pitch direction) to move the rotation portion 10 vertically. The panning rotation unit 116 is a rotation mechanism unit including a panning driving motor that rotates the rotation portion 10 about a vertical (perpendicular) axis (yaw direction) to move the rotation portion 10 laterally. The rotation mechanism units of the tilting rotation unit 115 and the panning rotation unit 116 are driven based on the driving signals generated by the rotational driving circuit 114 so that the rotation portion 10 performs the rotation operation for panning and tilting.

The angular velocity sensor 131 is a sensor capable of detecting a shake of the optical unit 101 as an angular velocity and is, for example, a vibrating gyroscope. The angular velocity sensor 131 is attached to the rotation portion 10 to detect the motion of the optical unit 101 included in the rotation portion 10. An angular velocity signal, which is a shake detection result detected by the angular velocity sensor 131, is transmitted to an amplifier 132. The amplifier 132 amplifies the angular velocity signal and outputs the amplified angular velocity signal to an A/D converter 133. The A/D converter 133 converts the angular velocity signal, which is an analog output signal amplified by the amplifier 132, into a digital signal to be processed by the microcomputer 109. The angular velocity signal converted into the digital signal is output to an angular velocity integration circuit 134. The angular velocity integration circuit 134 integrates an A/D conversion value of an amplification signal of an angular velocity signal, which is a shake detection result by the angular velocity sensor 131, to calculate angle information.

A reference value calculation circuit 135 calculates a reference value (sensor output in a stable state) corresponding to the offset voltage of the angular velocity sensor 131 based on the angle information indicating a shake of the rotation portion 10 output from the angular velocity integration circuit 134 and the rotational drive velocity of the rotation portion 10. According to the present disclosure and this specification, the rotational drive velocity is not necessarily limited to a velocity based on international units, and may be, for example, a rotation angle per control period. According to the present exemplary embodiment, the reference value calculation circuit 135 determines the stability of the image pickup apparatus 100 based on the angle information calculated by the angular velocity integration circuit 134, calculates the reference value of the angular velocity sensor 131, and updates the reference value set with the calculated reference value. A method for calculating the reference value will be described below in detail.

A subtracter 130 subtracts the reference value calculated and updated by the reference value calculation circuit 135 from the angular velocity signal (digital) output from the A/D converter 133. The angular velocity signal from which an offset component and a drift component have been removed is thereby calculated. The angular velocity signal from which the offset component and the drift component have been removed is the shake amount of the rotation portion 10, and the subtracter 130 functions as a shake amount calculation unit.

The angular velocity signal from which the offset component and the drift component have been removed is output to a variable high-pass filter (HPF) 136 having a function capable of varying frequency characteristics, and a signal from which a low-frequency component is cut off is output. A focal length calculation circuit 137 converts the angular velocity signal having passed through the variable HPF 136 into an optical axis eccentric angle corresponding to the focal length. A variable low-pass filter (LPF) 138 having a function capable of varying frequency characteristics plays a role of an integrator that outputs an angular displacement amount by pseudo-integrating an optical axis eccentric angle output from the focal length calculation circuit 137 after focal length conversion.

The panning determination circuit 139 determines a panning/tilting operation of the optical unit 101 included in the rotation portion 10 based on the angular velocity signal from which the offset has been removed, which is the output from the subtracter 130, and the angular displacement amount output from the variable LPF 138. At this time, the presence or absence of the panning operation is determined based on the angular velocity signal in the panning direction (the horizontal direction of the image pickup apparatus 100), from which the offset has been removed, and the output from the variable LPF 138 in which the angular velocity signal in the panning direction is processed. Similarly, the presence or absence of the tilting operation is determined based on the angular velocity signal in the tilting direction (the vertical direction of the image pickup apparatus 100), from which the offset has been removed, and the output from the variable LPF 138 in which the angular velocity signal is processed.

When it is determined that the panning operation is being performed, the panning is controlled by changing the frequency characteristics of the variable HPF 136 and the variable LPF 138, which process angular velocity signals in the panning direction. To change the frequency characteristic, among the angular velocity signals in the panning direction, from which the offset has been removed, the angular velocity caused by the panning operation of the optical unit 101 is removed (reduced) by the variable HPF 136 and the variable LPF so as not to be output to the correction amount calculation circuit 140. In other words, the panning is controlled by changing the frequency characteristics such that the calculated correction amount in the panning direction hardly includes the influence of the angular velocity caused by the panning operation of the optical unit 101. Similarly, when it is determined that the tilting operation is being performed, the tilting is controlled by changing the frequency characteristics of the variable HPF 136 and the variable LPF 138, which process the angular velocity signal in the tilting direction. This control is also performed by changing the frequency characteristics of the variable HPF 136 and the variable LPF 138 such that calculated correction amount in the tilting direction hardly includes the influence of the angular velocity caused by the tilting operation of the optical unit 101.

The correction amount calculation circuit 140 calculates a correction amount (correction target value) based on the panning determination result from the panning determination circuit 139 and the angular displacement amount output from the variable LPF 138.

A position detection sensor 151 is a sensor that detects the position of the correcting lens group 103 and is, for example, a hall sensor. The sensor signal of the position detection sensor 151 is amplified by the amplifier 152 and is output to the A/D converter 153. The A/D converter 153 converts the analog signal from the amplifier 152 into a digital signal to be processed in the microcomputer 109. A correcting lens control circuit 154 calculates a control amount of the correcting lens group 103 from a difference between the correction target value from the correction amount calculation circuit 140 and the current position of the correcting lens group 103 obtained via the A/D converter 153 and drives the correcting lens group 103 based on the control amount. The correcting lens control circuit 154 thereby functions as an image blur correction control unit. A pulse-width modulator (PWM) 155 outputs a control signal from the correcting lens control circuit 154 as an analog signal. A drive circuit 156 drives the correcting lens group 103 based on the control signal from the correcting lens control circuit 154. A motor 157 is an actuator that drives the correcting lens group 103 in accordance with the output of the drive circuit 156 and is, for example, a voice coil motor (VCM).

In FIG. 1B, it is assumed that a single microcomputer 109 controls, as a system, an optical drive block related to driving of the optical unit 101, a shake correction amount calculation block that calculates a correction amount from shake detection performed by the angular velocity sensor 131, and a correction block that controls the correcting lens group 103. However, each block may be controlled while communicating as a separate microcomputer system, or one or two blocks may be controlled as one microcomputer system. Each block may also be realized by a plurality of microcomputers. According to the present exemplary embodiment, it is assumed that the microcomputer 109 is installed inside the base portion 40, but the position thereof is not particularly limited, and some or all thereof may be provided in the rotation portion 10.

Figure 2:
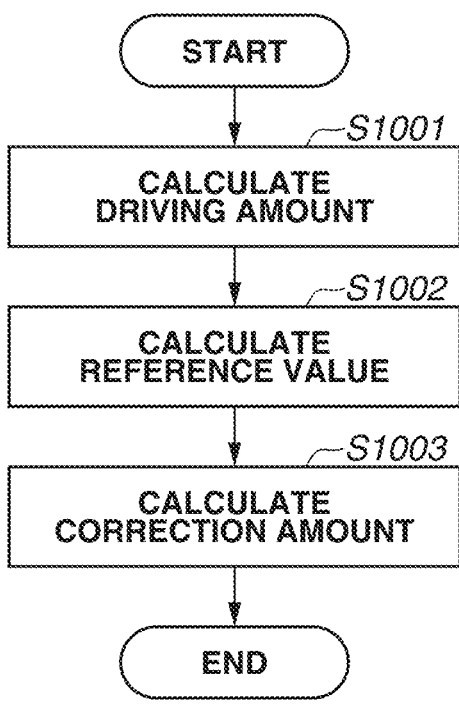
FIG. 2 is a flowchart illustrating control of reference value calculation according to one or more aspects of the present disclosure.

Next, a method for acquiring a shake amount according to the present exemplary embodiment will be described with reference to FIG. 2. FIG. 2 is a flowchart illustrating a reference value calculation method according to the present exemplary embodiment. This processing flow is repeatedly executed at a predetermined period (e.g., an image capturing period).

In step S1001, the driving amount determination unit 112 calculates the panning/tilting driving amount of the rotation portion 10. As described above, according to the present exemplary embodiment, the driving amount determination unit 112 determines the rotational driving amount based on the driving instruction given to the image pickup apparatus 100 via the interface such as the network 110 and outputs the information to the reference value calculation circuit 135.

In step S1002, the driving amount determination unit 112 calculates the reference value of the angular velocity sensor 131. Here, the driving amount determination unit 112 calculates the reference value based on the angle information obtained from the angular velocity integration circuit 134 and the rotational driving amount acquired in step S1001 and updates the stored reference value with the newly calculated reference value. A method for calculating the reference value will be described below.

In step S1003, an image blur correction amount is calculated based on the shake amount detected by the angular velocity sensor 131 and the reference value calculated in step S1002. Here, the angular velocity signal (from which the offset and drift components have been removed) is acquired, which is obtained by the subtracter 130 by subtracting the reference value updated in step S1002 from the detected shake amount of the angular velocity sensor 131, i.e., the digital output signal of the A/D converter 133. Then, after the angular velocity signal (from which the offset and drift components have been removed) is sequentially input to the variable HPF 136, the focal length calculation circuit 137, and the variable LPF, the correction amount calculation circuit 140 calculates the image blur correction amount. In addition, in this step, panning (tilting) is also determined, and when it is determined that panning (tilting) is being performed, the frequency characteristics of the variable HPF 136 and the variable LPF 138 are changed as described above. The image blur correction amount is thereby calculated after a component caused by panning (tilting) is removed from the angular velocity signal output from the subtracter 130.

Although an example of the image blur correction amount calculation method has been described above, other image blur correction amount calculation methods are not particularly limited. This is because the influence of the offset and drift components can be reduced by removing the offset and drift components included in the shake detection result by using the reference value calculated in step S1002.

A method for calculating the reference value in step S1002 will be described in detail. The angular velocity sensor 131 is provided in the rotation portion 10 together with the optical unit 101. Thus, not only the shake of the image pickup apparatus 100 itself but also the angular velocity due to the rotational driving of the rotation portion 10 are detected from the shake detection result of the angular velocity sensor 131 when the rotation portion 10 performs rotational driving for panning/tilting. The shake of the image pickup apparatus 100 itself is a motion applied to the base portion 40 and refers to, for example, a shake applied by an influence, such as wind, even when the image pickup apparatus 100 is fixed to a vehicle, such as a ship, or fixed to a building. Since the detection result of the angular velocity sensor 131 includes a drift component and an offset component of the reference value due to the influence of a temperature, the shake component is correctly acquired by correctly acquiring the reference value. According to the present exemplary embodiment, the angular velocity component due to the rotational driving of the rotation portion 10 is subtracted from the angular velocity signal, which is the shake detection result detected by the angular velocity sensor 131, so that it is possible to calculate the reference value from which the influence of the rotational component is removed even when the rotation portion 10 is being driven to rotate. The reference value during the rotational driving can be calculated by the following equation in a simplified manner.

Reference value of angular velocity sensor=detected angular velocity (shake detection result)−panning/tilting rotational angular velocity When no rotational driving is performed, the rotational angular velocity of the optical unit 101 is 0. Thus, when the panning/tilting rotational angular velocity is calculated as 0 in the above equation, the reference value may be calculated based on the above equation even when no rotational driving is performed. However, the calculation may be switched such that the reference value of the angular velocity sensor 131 equals the angular velocity signal of the angular velocity sensor 131 in a case where no rotational driving is performed after the determination of panning/tilting operation.

However, in the calculation of the reference value, it is desired that the number of error factors be small in order to increase the calculation accuracy. Thus, instead of calculating the output of the angular velocity using the digital output of the A/D converter 133 as it is, an average value for a predetermined time or a value obtained by extracting a low-frequency component through an LPF may be used. It is thereby possible to reduce the influence of an error component (e.g., a shake component applied to the image pickup apparatus 100) other than the offset component and the drift component included in the shake detection result of the angular velocity sensor 131. Since Japanese Patent Application Laid-Open No. 2005-151542 or the like describes the method for calculating the reference value using the average value or the value subjected to LPF processing, a detailed description thereof will be omitted. Typically, the shake component is an amplitude motion having a predetermined frequency, and thus the offset component and the drift component may be more accurately calculated by removing the component caused by the amplitude motion by using the average value and the low-frequency component. When an average value for a predetermined time is used as the "detected angular velocity" in the above equation, it is preferable to use an average value for the same time as the "panning/tilting rotational angular velocity". Similarly, when a value obtained by extracting a low-frequency component by LPF processing is used as the "detected angular velocity" in the above equation, it is preferable to use a value obtained by performing LPF processing with the same time characteristic and extracting a low-frequency component as the "panning/tilting rotational angular velocity".

As described above, in the system illustrated according to the present exemplary embodiment, even when the rotational driving for panning and tilting of the rotation portion 10 is performed, the influence of the panning and tilting may be reduced, and the reference value may be accurately calculated. This makes it possible to increase the accuracy of processing using a shake detection result, such as image blur correction, even during the rotational driving for panning and tilting.

Next, a second exemplary embodiment will be described. The present exemplary embodiment is different from the first exemplary embodiment in that the reference value is not calculated when the panning/tilting drive velocity of the rotation portion 10 is high. The system configuration according to the present exemplary embodiment may be the same as that of the first exemplary embodiment illustrated in FIGS. 1A and 1B, and a description thereof will be omitted.

Figure 3:
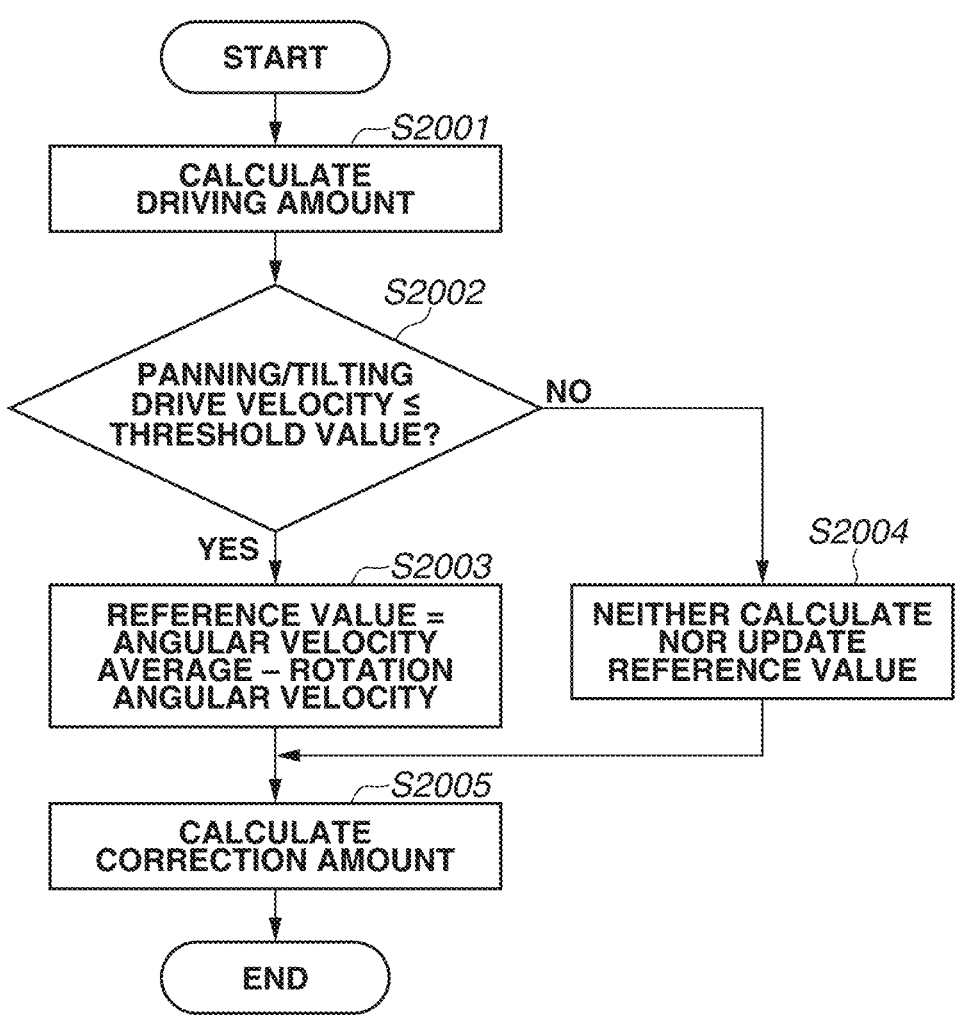
FIG. 3 is a flowchart illustrating control of reference value calculation according to one or more aspects of the present disclosure.

An operation flow of calculation and update of the reference value performed by the reference value calculation circuit 135 according to the present exemplary embodiment will be described with reference to FIG. 3. FIG. 3 is a flowchart illustrating a reference value calculation method according to the present exemplary embodiment. This flow is repeatedly executed at a predetermined period (e.g., an image capturing period) as in the first exemplary embodiment.

In step S2001, the driving amount determination unit 112 calculates the panning/tilting driving amount of the rotation portion 10. Here, as in the first exemplary embodiment, the driving amount determination unit 112 determines a rotational driving amount based on a driving instruction given to the image pickup apparatus 100 via an interface, such as the network 110, and outputs the information to the reference value calculation circuit 135.

In step S2002, the panning/tilting drive velocity is determined. Here, it is determined whether the driving angular velocity is more than a predetermined threshold value based on the rotational driving amount determined by the driving amount determination unit 112. When the driving angular velocity is less than or equal to the predetermined threshold value (YES in step S2002), the processing proceeds to step S2003. When the driving angular velocity is more than the predetermined threshold value (NO in step S2002), the processing proceeds to step S2004. This determination is performed for each of the panning direction and the tilting direction. When the driving angular velocity in only any one of the directions is more than the predetermined threshold value, the processing may proceed to step S2004 only for the direction in which the driving angular velocity is more than the predetermined threshold value. Even when the driving angular velocity in only any one of the panning direction and the tilting direction is more than the predetermined threshold value, the processing may proceed to step S2004 in the calculation of the reference values for both the panning direction and the tilting direction.

In step S2003, the reference value of the angular velocity sensor 131 is calculated. According to the present exemplary embodiment, as in the first exemplary embodiment, the reference value is calculated based on the angle information obtained from the angular velocity integration circuit 134 and the rotational driving amount acquired in step S2002, the stored reference value is updated with the newly calculated reference value, and the processing proceeds to step 2005. Conversely, in step S2004, the reference value is neither calculated nor updated, and the processing proceeds to step S2005 while maintaining the set reference value.

In step S2005, the image blur correction amount is calculated based on the shake amount detected by the angular velocity sensor 131 and the reference value calculated in step S2003. Here, the angular velocity signal is acquired, which is obtained by the subtracter 130 by subtracting the currently set reference value that is calculated in the current, previous, or earlier step S2003, from the detected shake amount of the angular velocity sensor 131, i.e., the digital output signal of the A/D converter 133. Then, the correction amount calculation circuit 140 calculates an image blur correction amount based on the angular velocity signal output from the subtracter 130. Even in this step, panning (tilting) is determined in the same way as in step S1003, and when panning (tilting) is being performed, a component caused by the driving is removed, and then the image blur correction amount is calculated. In addition, the method for calculating the image blur correction amount described here is only an example of the method for calculating the image blur correction amount, which is also the same as step S1003.

According to the present exemplary embodiment, it is determined, in step S2002, whether the panning/tilting drive velocity is more than the predetermined threshold value, and the reference value is not updated when the velocity is more than the threshold value. The reason for this is as follows.

In the panning or tilting operation, it is expected that the (unintended) vibration at the time of driving the rotation portion 10 increases as the rotation portion 10 is driven at a higher speed. When the vibration at the time of driving becomes large in this way, the output of the angular velocity sensor 131 also includes vibration components. In image blur correction, it is also desirable to correct these vibration components, but this causes an error in the reference value calculation. Thus, as a condition for calculating the reference value, the reference value is not newly calculated when the panning/tilting drive velocity of the rotation portion 10 is more than the predetermined threshold value, and the reference value is calculated and updated only when the drive velocity is less than or equal to the predetermined threshold value. It is thereby possible to avoid the influence of the error component due to the high-speed driving, so that the accuracy of the reference value calculation may be improved.

As described above, in the system according to the present exemplary embodiment, the accuracy of the reference value is improved by calculating the reference value in accordance with the drive velocity state when the lens barrel is rotationally driven for panning and tilting. This makes it possible to increase the accuracy of shake correction even during the rotational driving for panning and tilting.

The present disclosure has been described in detail based on the preferred exemplary embodiments thereof, however, the present disclosure is not limited to these specific exemplary embodiments. The present disclosure also includes various modes within the scope without departing from the gist of the present disclosure. Some of the above-described exemplary embodiments may be appropriately combined.

According to the above-described first and second exemplary embodiments, an example has been described in which the value obtained by subtracting the panning/tilting rotational angular velocity from the output of the angular velocity sensor 131 is used as the reference value calculation method; however, the reference value calculation method is not limited thereto. The reference value calculation circuit 135 calculates the reference value based on at least the output of the angular velocity sensor 131 and the drive velocity of the rotation portion 10 so that the reference value may be calculated even when the angular velocity sensor 131 is provided in the rotation portion 10 and the rotation portion 10 is being driven for panning/tilting. The reference value calculation method is not particularly limited, and a method using a motion vector as described in Japanese Patent Application Laid-Open No. 2005-151542 may be used. For example, the image pickup apparatus 100 uses a vector acquisition unit to acquire a motion vector from an image captured by the optical unit 101. Then, the acquired motion vector may be converted into an angular velocity, and a difference between a result (the left side of the equation for calculating the reference value as described in the first exemplary embodiment) which is obtained by subtracting the rotational angular velocity of the rotation portion 10 from the output of the angular velocity sensor 131 and the motion vector (angular velocity conversion) may be used as a reference value. In a case where a motion vector is used, the motion vector is influenced when image blur correction is optically performed by moving a shift lens or an image pickup element in the direction perpendicular to the optical axis. Thus, when image blur correction is optically performed, for example, as described in Japanese Patent Application Laid-Open No. 2012-037778, the reference value is calculated in consideration of the image blur correction amount. As described above, by using the result obtained by subtracting the rotational angular velocity of the rotation portion 10 from the output of the angular velocity sensor 131 instead of the output of the angular velocity sensor in the known reference value calculation method, the reference value may be calculated with high accuracy even while the rotation portion 10 is performing panning/tilting driving.

According to the above-described first and second exemplary embodiments, the driving target value and the rotational driving amount for panning/tilting driving of the rotation portion 10 are acquired from the driving amount determination unit 112, and the angular velocity for panning/tilting driving is acquired based on the acquired driving target value and rotational driving amount. However, in a case where a position detection sensor that detects rotational driving of the rotation portion 10 with respect to the base portion 40 is provided, the panning/tilting rotational angular velocity may be acquired based on an output of the position detection sensor. That is, the position detection sensor and a drive velocity calculation circuit may be used as a drive velocity acquisition unit that acquires the driving amount per unit time.

According to the above-described first and second exemplary embodiments, the mode has been described in which the reference value is calculated in the main body of the image pickup apparatus 100; however, the reference value may be acquired by another apparatus connected via a network. In this case, the apparatus functions as a shake amount acquisition apparatus. In a case where another apparatus calculates the reference value, the output of the angular velocity sensor 131 and the angular velocity for panning/tilting driving are transmitted to the apparatus via the communication control unit 111. When the apparatus is a client apparatus that transmits a driving instruction to the image pickup apparatus 100, the client apparatus may acquire the angular velocity for panning/tilting driving based on the driving instruction. Even when an apparatus different from the client apparatus calculates the reference value, the output of the angular velocity sensor 131 may be received from the image pickup apparatus 100, and the angular velocity for panning/tilting driving may be received from the client apparatus. In a case where the reference value is calculated outside the image pickup apparatus 100, an apparatus that calculates the reference value may calculate the shake amount based on the shake detection result and the reference value or may transmit the calculated reference value to the image pickup apparatus 100. In this case, the image pickup apparatus 100 calculates the shake amount based on the shake detection result and the reference value.

According to the above-described first and second exemplary embodiments, the description has been given of the lens-integrated panning-tilting camera as an example; however, the configuration of the image pickup apparatus 100 is not limited thereto as long as at least any one of panning and tilting driving is available. For example, the present disclosure may be applied to a lens interchangeable type panning/tilting camera or a gimbal camera capable of performing panning/tilting driving. The intended use is also not particularly limited, and may be what is called a monitoring camera, a camera used for video production, or a shooting system configured by combining a panhead or gimbal capable of performing panning/tilting driving and a camera. The panning/tilting driving may be performed in real time based on a user's instruction, may be performed at a preset time or at a preset time interval by preset driving, or may be performed by a camera that automatically tracks a subject and performs panning/tilting driving.

According to the above-described first and second exemplary embodiments, panning determination (including tilting) is performed based on the output of the angular velocity sensor 131, but the present disclosure is not limited thereto. In a case where the motion of the image pickup apparatus 100 itself is ignored, for example, when the image pickup apparatus 100 is fixed to a building or installed, panning determination may be performed based on a driving instruction or a driving amount based on the driving instruction.

According to the above-described first and second exemplary embodiments, the mode in which the shake correction is performed using the output of the angular velocity sensor 131 has been described; however, the intended use of the output of the angular velocity sensor 131 is not limited thereto. For example, the output of an angular velocity sensor 131 may be used to accurately acquire the attitude (attitude angle) of the rotation portion 10.

In the field of visual effects (VFX), there is a demand for accurate acquisition of the attitude of the image pickup apparatus, and the exemplary embodiments of the present disclosure can also be applied to such a field.

The exemplary embodiments of the present disclosure also include a case where a software program for implementing the functions of the above-described exemplary embodiments is supplied from a recording medium directly or via wired/wireless communication to a system or apparatus including a computer capable of executing the program, and the program is executed.

The program code itself, which is supplied to and installed in the computer in order to implement the functional processing according to the exemplary embodiments of the present disclosure by the computer, also realizes the exemplary embodiments of the present disclosure. That is, the exemplary embodiments of the present disclosure also include the computer program itself for realizing the functional processing according to the present disclosure.

In this case, the program may be in any form, such as object code, a program executed by an interpreter, or script data supplied to an operating system (OS), as long as the program has a function of a program.

Recording media for supplying the program may be, for example, magnetic recording media such as hard disks and magnetic tapes, optical/magneto-optical storage media, and nonvolatile semiconductor memories.

As a method for supplying the program, a method is also possible of storing a computer program for forming the exemplary embodiments of the present disclosure in a server on a computer network and allowing a connected client computer to download and program the computer program.

According to the exemplary embodiment of the present disclosure, it is possible to calculate the reference value of a shake detection unit even during a panning/tilting operation.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-105950, filed Jun. 28, 2023, which is hereby incorporated by reference herein in its entirety.

What is claimed is:

1. A shake amount acquisition apparatus comprising:
one or more processors;
one or more memories including instructions stored thereon that, when executed by the one or more processors, cause the shake amount acquisition apparatus to function as:
a first acquisition unit configured to acquire a shake detection result from a shake detection unit that is configured to detect a shake and is provided in a rotation portion driven to rotate with respect to a base;
a second acquisition unit configured to acquire a drive velocity of the rotation portion; and
a reference value calculation unit configured to calculate a reference value of the shake detection unit, the reference value corresponding to an offset component of an output of the shake detection unit in a stable state.

2. The shake amount acquisition apparatus according to claim 1, further comprising a shake amount calculation unit configured to calculate a shake amount based on the shake detection result and the reference value.

3. The shake amount acquisition apparatus according to claim 2,
wherein the rotation portion includes an image pickup element configured to capture a subject image formed by an imaging optical system, and
the shake amount acquisition apparatus further comprises:
a correction amount calculation unit configured to calculate an image blur correction amount based on the shake amount calculated by the shake amount calculation unit; and
an image blur correction control unit configured to control an image blur correction unit configured to correct a blur of an image captured by the image pickup element, and to control the image blur correction unit based on the image blur correction amount.

4. The shake amount acquisition apparatus according to claim 1,
wherein the shake detection unit is capable of detecting an angular velocity of the rotation portion, and
wherein the reference value calculation unit calculates the reference value based on a value obtained by subtracting an angular velocity of rotational driving of the rotation portion from the angular velocity detected by the shake detection unit.

5. The shake amount acquisition apparatus according to claim 4, wherein the reference value calculation unit calculates the reference value based on a value obtained by subtracting a low-frequency component of the drive velocity from a low-frequency component included in the shake detection result.

6. The shake amount acquisition apparatus according to claim 1, wherein the reference value calculation unit calculates the reference value in a case where the drive velocity is less than or equal to a predetermined threshold value.

7. The shake amount acquisition apparatus according to claim 1,
wherein the rotation portion includes an image pickup element configured to capture a subject image formed by an imaging optical system,
wherein the shake amount acquisition apparatus further includes a motion vector acquisition unit configured to acquire a motion vector based on an image captured by the image pickup element, and
wherein the reference value calculation unit calculates the reference value based on the shake detection result, the drive velocity, and the motion vector.

8. The shake amount acquisition apparatus according to claim 7, further comprising:
a shake amount calculation unit configured to calculate a shake amount based on the shake detection result and the reference value;
a correction amount calculation unit configured to calculate an image blur correction amount based on the shake amount calculated by the shake amount calculation unit; and
an image blur correction control unit configured to control an image blur correction unit configured to correct a blur of an image captured by the image pickup element,
wherein the image blur correction control unit controls the image blur correction unit based on the image blur correction amount.

9. The shake amount acquisition apparatus according to claim 1, further comprising an attitude angle calculation unit configured to calculate an attitude angle of the rotation portion based on the shake detection result and the reference value.

10. An image pickup apparatus comprising:
the shake amount acquisition apparatus according to claim 1;
the rotation portion including the shake detection unit and an image pickup element configured to capture a subject image formed by an imaging optical system;
the base;
a rotational driving unit configured to drive and rotate the rotation portion with respect to the base; and
a rotation control unit configured to control rotational driving by the rotational driving unit.

11. The image pickup apparatus according to claim 10, wherein the second acquisition unit acquires the drive velocity from the rotation control unit.

12. The image pickup apparatus according to claim 10, wherein the second acquisition unit acquires the drive velocity based on an output of a position detection unit configured to detect a position of the rotation portion by the rotational driving unit.

13. A control apparatus for an image pickup apparatus, the control apparatus comprising:
a shake amount acquisition apparatus comprising:
one or more processors;
one or more memories including instructions stored thereon that, when executed by the one or more processors, cause the shake amount acquisition apparatus to function as:

a first acquisition unit configured to acquire a shake detection result from a shake detection unit that is configured to detect a shake and is provided in a rotation portion driven to rotate with respect to a base;

a second acquisition unit configured to acquire a drive velocity of the rotation portion; and a reference value calculation unit configured to calculate a reference value of the shake detection unit, the reference value corresponding to an offset component of an output of the shake detection unit in a stable state, based on the shake detection result and the drive velocity; and a communication unit configured to communicate with the image pickup apparatus including the base and the rotation portion including the shake detection unit and an image pickup element configured to capture a subject image formed by an imaging optical system, wherein each of the first acquisition unit and the second acquisition unit acquires information indicating the shake detection result and the drive velocity via the communication unit.

14. The control apparatus according to claim 13, wherein the communication unit transmits the reference value calculated by the reference value calculation unit to the image pickup apparatus.

15. A shake amount acquisition method comprising:

acquiring a shake detection result from a shake detection unit that is configured to detect a shake and is provided in a rotation portion driven to rotate with respect to a base;

acquiring a drive velocity of the rotation portion; and calculating a reference value of the shake detection unit-, the reference value corresponding to an offset component of an output of the shake detection unit in a stable state, based on a shake detection result and the drive velocity.

* * * * *